United States Patent [19] [11] 3,974,569
Albertazzi [45] Aug. 17, 1976

[54] AUTOMATIC STATION FOR MEASURING THE SIZES OF MECHANICAL WORKPIECES

[75] Inventor: Gastone Albertazzi, Bologna, Italy

[73] Assignee: Finike Italiana Marposs-Soc. In Accomandita Semplica di Marlo Possati & C., Bentivoglio (BO), Italy

[22] Filed: Oct. 9, 1974

[21] Appl. No.: 513,394

[30] Foreign Application Priority Data
Apr. 5, 1974 Italy................................. 3341/74

[52] U.S. Cl. ............................ 33/143 R; 33/147 E; 33/178 R; 209/88 R
[51] Int. Cl.² ..................... G01B 5/08; B07B 13/04; B07C 5/07; G01B 3/38
[58] Field of Search........... 33/143 L, 147 E, 147 L, 33/147 N, 178 E, 178 R, 174 L, 174 R, 148 H; 209/82, 88 R

[56] References Cited
UNITED STATES PATENTS
2,727,311   12/1955   Aller et al. ....................... 33/174 L
3,169,323   2/1965   Hold ............................... 33/147 N Primary Examiner—Richard E. Aegerter
Assistant Examiner—Steven L. Stephan
Attorney, Agent, or Firm—Stevens, Davis, Miller & Mosher

[57] ABSTRACT

An automatic measuring station for measuring the dimensions of workpieces comprising a conveyor for loading and unloading workpieces; a slide supporting, through parallel leaf springs having the ends clamped to the slide, positioning and reference elements adapted to contact the workpieces for displacing and positioning them into the measurement positions; stationary positioning and reference elements adapted to cooperate with the workpieces for positioning them, together with the positioning and reference elements supported by the slide and displaceable with respect to the slide; and measuring heads provided with measuring elements adapted to cooperate with the surface of the workpieces for measuring their maximum dimension in which the measuring heads are fixed to the positioning and reference elements supported by the slide through the leaf springs.

2 Claims, 4 Drawing Figures

AUTOMATIC STATION FOR MEASURING THE SIZES OF MECHANICAL WORKPIECES

The present invention relates to an automatic station for measuring the sizes of mechanical workpieces, comprising movable means for positioning and providing a reference to the workpiece and measuring means with detecting means adapted to cooperate with the workpiece surface to measure said sizes. In particular, the invention relates to a measuring station for checking the maximum diameter of pistons of internal combustion engines machined on a transfer line.

It already is known to measure workpieces on transfer lines, both during a machining step and between a certain step and the subsequent one, or at the exit of the line.

The workpieces are conveyed in sequence, for instance by a pilger conveyor, to a measuring station. The measuring station comprises a mobile slide which carries a support for movable positioning and reference elements.

On its turn, the support is mobile with regard to the slide as it is connected with the latter through a bushing having balls and a return spring which allow a relative axial displacement. Moreover, measuring devices, consisting of electronic gauges are mounted on the slide.

As a consequence of the forward stroke of the slide the movable positioning and reference elements come into contact with the workpiece and push it towards fixed positioning and reference elements supported by the station bed.

Due to the provision of the ball and return spring bushing, too stiff impacts and excessive pressures between the positioning and reference means and the workpiece are avoided. After the forward stroke of the slide and the resultant relative displacement of the support for the movable positioning and reference elements, the workpiece is measured by the measuring devices.

The measurements made in a station of this kind are not always sufficiently accurate since in consequence of clearances, wear, frictions, dirt etc., or simply because of the different sizes of the workpieces, the position of the workpieces relative to the slide (when it is at the end of the stroke) and therefore to the measuring devices, may change.

Particularly for non-symmetrical workpieces or workpieces having a complicated shape, the variability of the relative position may lead the feeling elements of the measuring devices to act on the workpieces in positions different from those corresponding to the sizes to be measured.

Another drawback of these measuring stations resides in that the feeling elements may undergo casual impacts which bring about loss of calibration or failures.

It is therefore an object of the present invention to provide a measuring station having high reliability of service and in which the feeling elements are in condition of getting in touch exactly with the sections of the workpieces on which the measurements must be carried out and are protected from casual impacts. This and other objects and advantages are attained by an automatic station for measuring the sizes of mechanical workpieces comprising means for loading and unloading the workpieces; movable means which supports, through support means adapted to allow relative displacements, movable elements for positioning and providing a reference to the workpieces; and measuring devices provided with measuring means adapted to cooperate with the surface of the workpieces, and in which, according to the invention, said measuring devices are rigidly connected with said movable elements which position and provide a reference to the workpieces.

The invention will be described in detail with reference to preferred embodiments which are given as non-limiting examples, and illustrated in the attached drawings in which.

The pistons of internal combustion engines have a transversal hole for the housing of the piston pin. For obtaining the dynamic balancing of the pressures between the lateral surface of the piston and the walls of the relative cylinder, the axis of the hole is off-center in respect to the axis of the intermediate plane containing the axis of the piston. The transversal section of the piston, in its lower part, (opposed to that one comprising the seating grooves for the piston rings) has a form which can be inscribed in an ellipse. The major axis of the ellipse is perpendicular to the axis of the hole.

The size measurements commonly made on all of the pistons machined on a transfer line have usually the aim of measuring the maximum diameter. Therefore the measurements should be made in correspondence with the major diameter of the ellipse.

Figure 1:
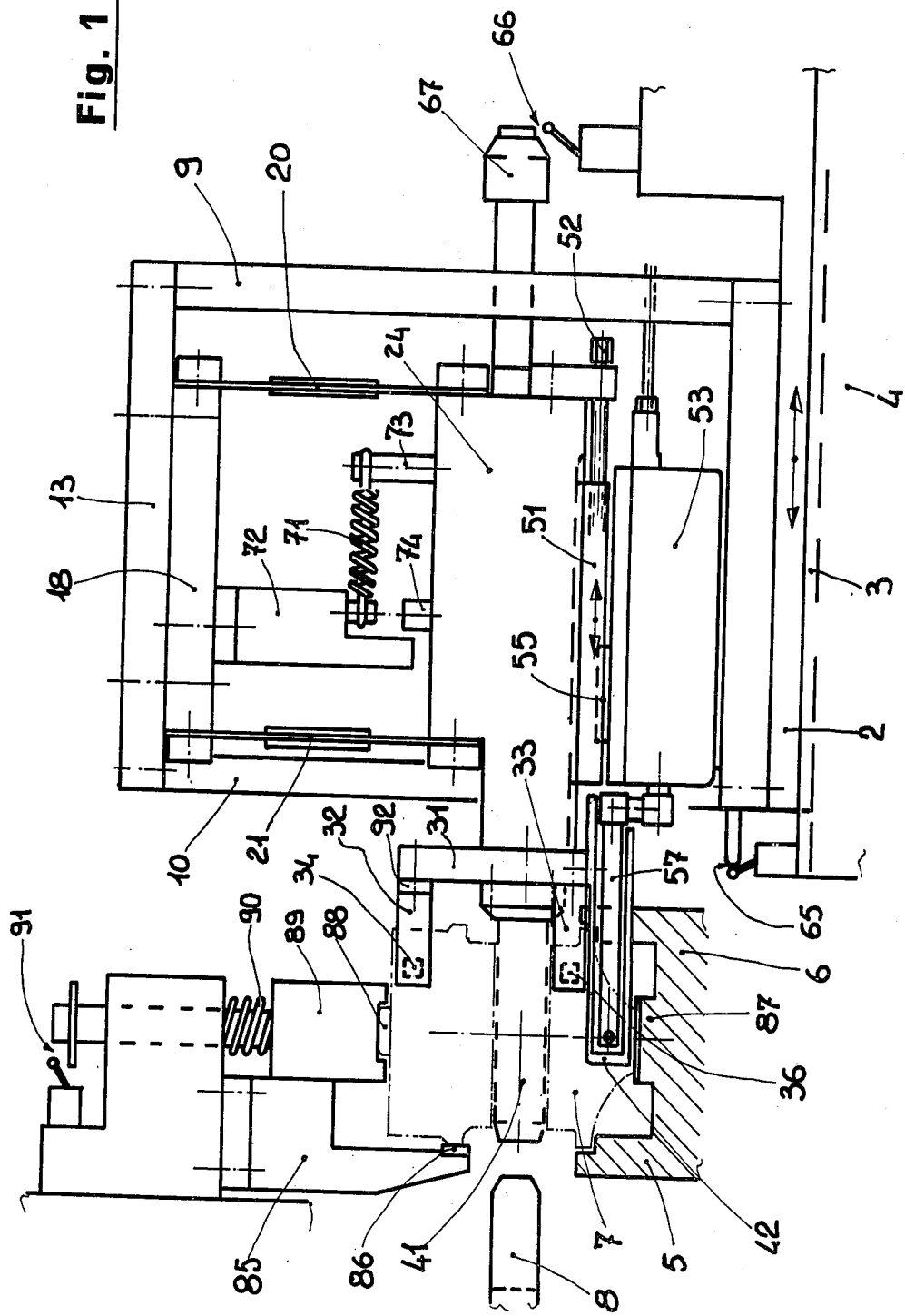
FIG. 1 is a partially sectioned side-view of an automatic station for measuring the maximum diameter of pistons machined on a transfer line.

A measuring station, adapted to effect this operation automatically, comprises, as shown in FIG. 1, a slide 2 movable on guides 3 with respect to a base 4.

Base 4 also supports two rails 5 and 6, on which the sides of pistons 7 to be measured are supported.

Pistons 7 are advanced along the last section close to the measuring station, by a fork 8 doing a "pilger" movement.

Fork 8 is coupled to another similar fork, not shown, which carries out the unloading operation of the measured piston. Slide 2 supports rigidly, by means of stanchions 9, 10, 11 and 12 an horizontal plate 13.

Two longitudinal elements 18 and 19 are connected to plate 13. Four thin leaf springs 20, 21, 22 and 23, fixed at the top to the ends of elements 18 and 19, carry on their lower parts a support 24. The leaf springs are strengthened in the central parts by means of welded elements increasing their thickness, so that only the ends of the leaf springs are flexible and may be bent.

Leaf springs 20, 21, 22 and 23, support 24 and plate 13 together with elements 18 and 19 constitute a moving measuring system of the "parallelogram" type.

Support 24 is therefore hanging on plate 13 and, due to the leaf springs elasticity, it may oscillate horizontally with regard to the same plate 13 and slide 2.

The oscillation direction of support 24 is parallel to the movement direction of slide 2 with regard to base 4 and both directions are perpendicular to the advancement direction of pistons 7 along rails 5 and 6.

A vertical supporting plate 31 is fixed to oscillating support 24, on the side close to rails 5 and 6.

An element 32, V-shaped, is fixed to the top of the front-part of plate 31, and a second V-shaped element, 33, is fixed to the bottom of the plate.

Each arm of V-shaped elements 32 and 33 carries a reference block 34, 35, 36 and 37 respectively. A pin 41 is fixed to plate 31 too, in an intermediate position between V-shaped elements 32 and 33. Lastly, a protection and driving element 42, U-shaped, is fixed to the lower side of plate 31.

The lower part of oscillating support 24 is integral with a slide 51, sliding on dovetail guides, whose position may be adjusted acting on screw 52.

Two measuring heads 53 and 54 are connected to slide 51 through known circular connections 55 and 56, allowing an angular regulation of the heads position.

Each head carries a feeler arm, 57 and 58 respectively, to which a feeler 59 and 60 is fixed.

The feeler arms and relative feelers are embraced by the arms of U-shaped element 42, which protect them from possible casual impacts, during the measurement operations and drive piston 7 to enter into the measurement position.

A microswitch 65 is provided to stop slide 2 in a predetermined position, while another microswitch 66, operated by support 24 through a dog 67, prevents the positioning and measuring means from damage caused by a wrong positioning of pistons or by defective pistons.

Microswitches 65 and 66, control in a known way and not shown, the operating elements of slide 2.

An extension spring 71, connected between an element 72 integral with upper plate 13 and an element 73 integral with oscillating support 24, supplies to the same support the pressure requested to lock piston 7 within the positioning means during the measuring operations.

A dog 74, connected to support 24, cooperates with element 72 in order to limit the maximum displacement of the same support, caused by spring 71.

Upon and by a side of rails 5 and 6, there is an element 85, integral with base 4 too, carrying a ledge or block 86 to provide a positioning and fixed reference for piston 7 to be measured. A fixed cam 87, between rails 5 and 6, supplies to piston 7 a positioning and lower reference surface.

At this machining step, the top of piston 7 (the dome) has still a centering cap 88.

During the measuring operations, a guide element 89, resiliently suspended to element 85 through a spring 90, is adapted to house cap 88 of the piston, making in this way an upper reference. In case the piston positioning is not correct, or if the piston is defective, a microswitch 91 signals the wrong position of guide 89 and therefore the piston is ejected from the line.

The device works as follows; every piston 7 to be measured is conveyed through fork 8 of a conveyor (not detailedly shown in the Figure) near the measuring station.

The orientation position of piston 7, at this moment, is such that the axis of the piston pin hole results aligned with the movement direction of oscillating support 24.

Then piston 7 is caught by fork 8 which, with a "pilger" movement places it in correspondence with the measuring station.

During this movement piston 7, whose sides were previously supported by rails 5 and 6, gets in touch with central cam 87 and is compelled to rise sliding on it.

At the same time cap 88 hoists guide 89, overcoming the resistance of spring 90.

After carrying the piston into the final position, fork 8 comes back, while slide 2 moves towards the piston.

During this movement pin 41 goes into the piston pin hole. The piston comes into U-shaped element 42, and V-shaped elements 32 and 33 embrace and push it towards fixed reference block 86, piston 7 thus being locked between block 86 and blocks 34, 35, 36 and 37.

Figure 2:
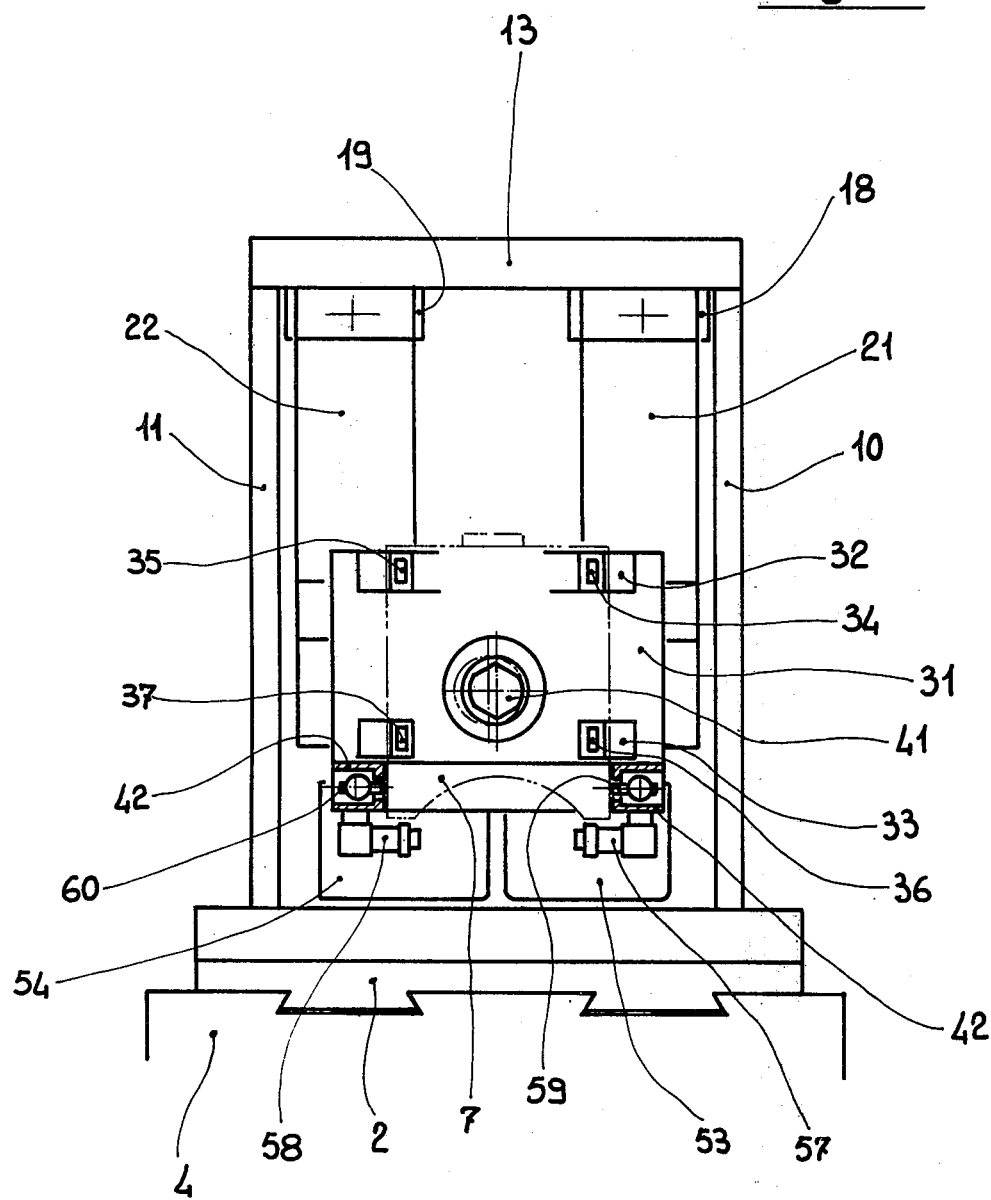
FIG. 2 is a partial front-view of the station shown in FIG. 1.

As previously seen, pistons 7 come in front of the measuring station with the pin holes aligned with pin 41, and therefore their real position has an indeterminateness of 180°. This must be duly taken into account because, the piston pin hole being non-symmetrical with regard to the piston axis, the hole itself may be located sometimes on the one side and sometimes on the opposite side of pin 41 axis (and of the vertical intermediate plate of V-shaped elements 32 and 33). In FIG. 2 there is shown the case of the pin hole being located on the left.

Consequently it is necessary that the pin 41 section is shorter than the pin hole section, at least by twice the distance between the pin axis and the piston axis.

Figure 3:
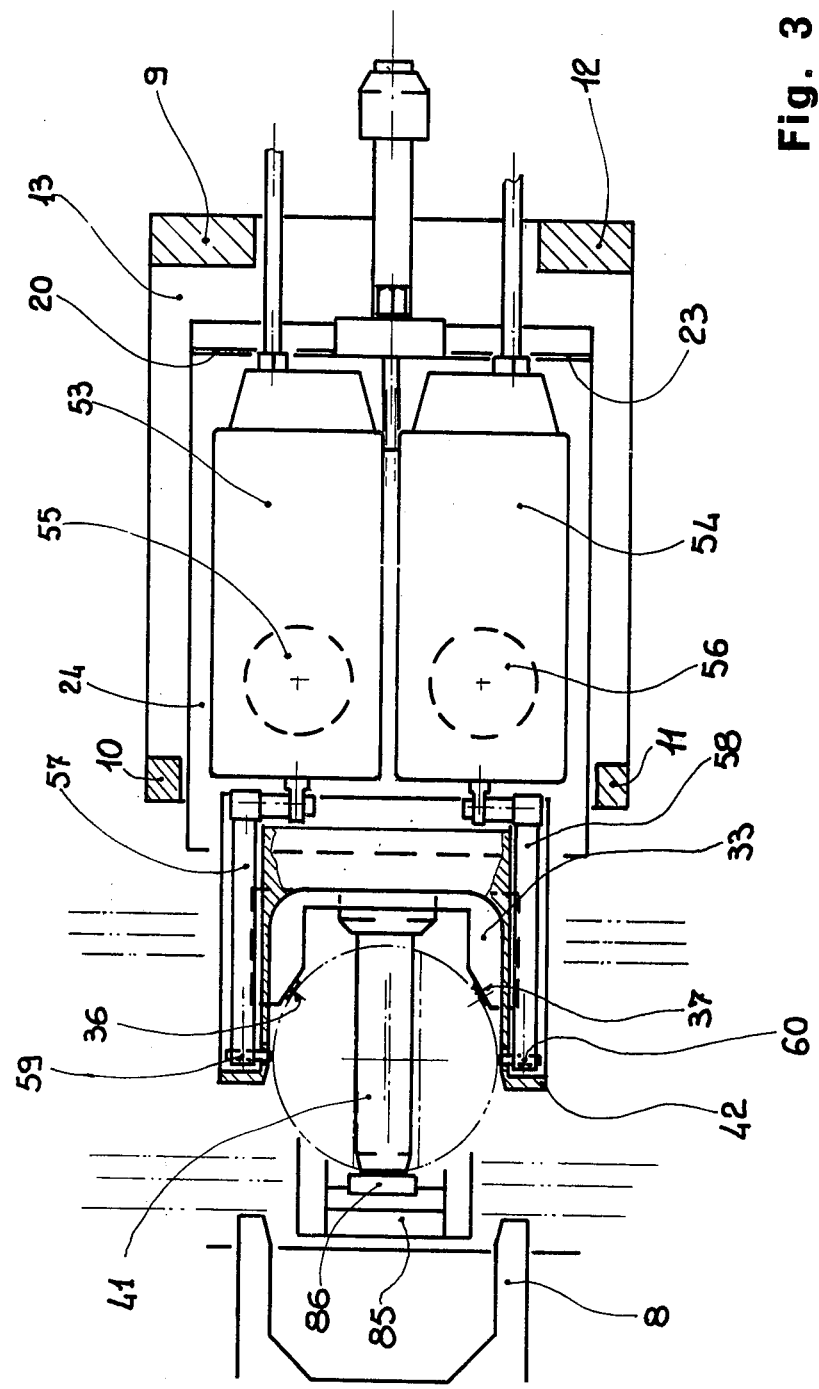
FIG. 3 is a partial plan view, looking from the bottom, of the station shown in the preceding figures.

In this way, pin 41 doubtless goes into the pin hole, while the contact between pin 41 and the wall of the hole takes place only on one of the sides (as shown in FIGS. 2 and 3). Pin 41 has the function of preventing the piston from rotating, since this would cause angular errors in the measurement (i.e. the major diameter of the ellipse would not be measured). Mobile blocks 34, 35, 36 and 37 and fixed block 86, which is located at about the same distance from the two V-shaped elements, prevent horizontal displacements of the piston, while cam 87 and recoiling guide 89 ensure the exact vertical positioning. Measuring heads 53 and 54 with relative feeler arms 57 and 58 being carried by oscillating support 24, move on together with elements 32, 33, 41 and 42 and therefore, when support 24 stops as the above elements have pushed and locked the piston against fixed ledge 86, feelers 59 and 60 are contacting workpiece 7, in the measurement position and supply the measuring signal immediately.

Of course the correct position of feelers 59 and 60 and reference elements 34, 35, 36, 37 and 86 is determined, at the start, by measuring a master.

During this zero setting operation the introduction of spacers 92 between V-shaped element 32 and plate 31 may be made, in order to obtain, at the same time, the contact of all blocks 34, 35, 36, 37 and 86 against the lateral surface of piston 7. The exact position of feelers 59 and 60 is attained displacing longitudinally slide 51 by means of screw 52, turning heads 53 and 54 on their connections 55 and 56 and then operating on suitable adjusting screws provided on feeler arms 57 and 58. After doing the measurement, slide 2 goes back carrying support 24 and the connected elements. In the meanwhile both fork 8 and the other one, not shown, which have already come back, move on again towards the pistons 7 line.

The forks catch respectively the measured piston and the following one, so that they make a step along the line. Therefore the measured piston leaves the measuring station and continues its run on rails 5 and 6, while the following piston is carried just in front of the station to be measured on its turn.

Since the positioning and measuring means are supported by the same support 24, if the position of piston 7 is the correct one, it is sure that the measurement is really carried out on the maximum diameter.

On the contrary, if the position of piston 7 is not correct and pin 41 does not go into the pin hole, support 24 stops, while slide 2 continues its movement onwards along a certain section, until dog 67 operates microswitch 66, thus causing the return of slide 2 and the ejection of the piston.

In this way the measuring elements do not get in touch with the workpiece, and therefore damages and failures are avoided. These results could not be achieved if measuring heads 53 and 54 were directly connected to slide 2 because, in case of wrong positioning, the reference means supported by oscillating support 24 should stop, while slide 2, still moving on along a certain section, might push feelers 59 and 60 against the workpiece, damaging them consequently.

Moreover, the force pushing heads 53 and 54 would be very hard (slide 2 is generally displaced by a hydraulic device). On the contrary, if heads 53 and 54 are connected to oscillating support 24, this force may be limited as much as required (for example 2–3 Kgs). For this purpose it is sufficient to choose a spring 71 of suitable size.

If heads 53 and 54 were directly connected to slide 2, in addition to the above-mentioned drawbacks, which may generate such damages that the measuring station could stop working and consequently the transfer line might stop too, other errors would result, owing to the fact that the correct positioning of the measuring means would be entrusted only to slide 2, so depending on the accuracy of the slide guides, whose diminution may be caused by wear, dirt, etc.

Figure 4:
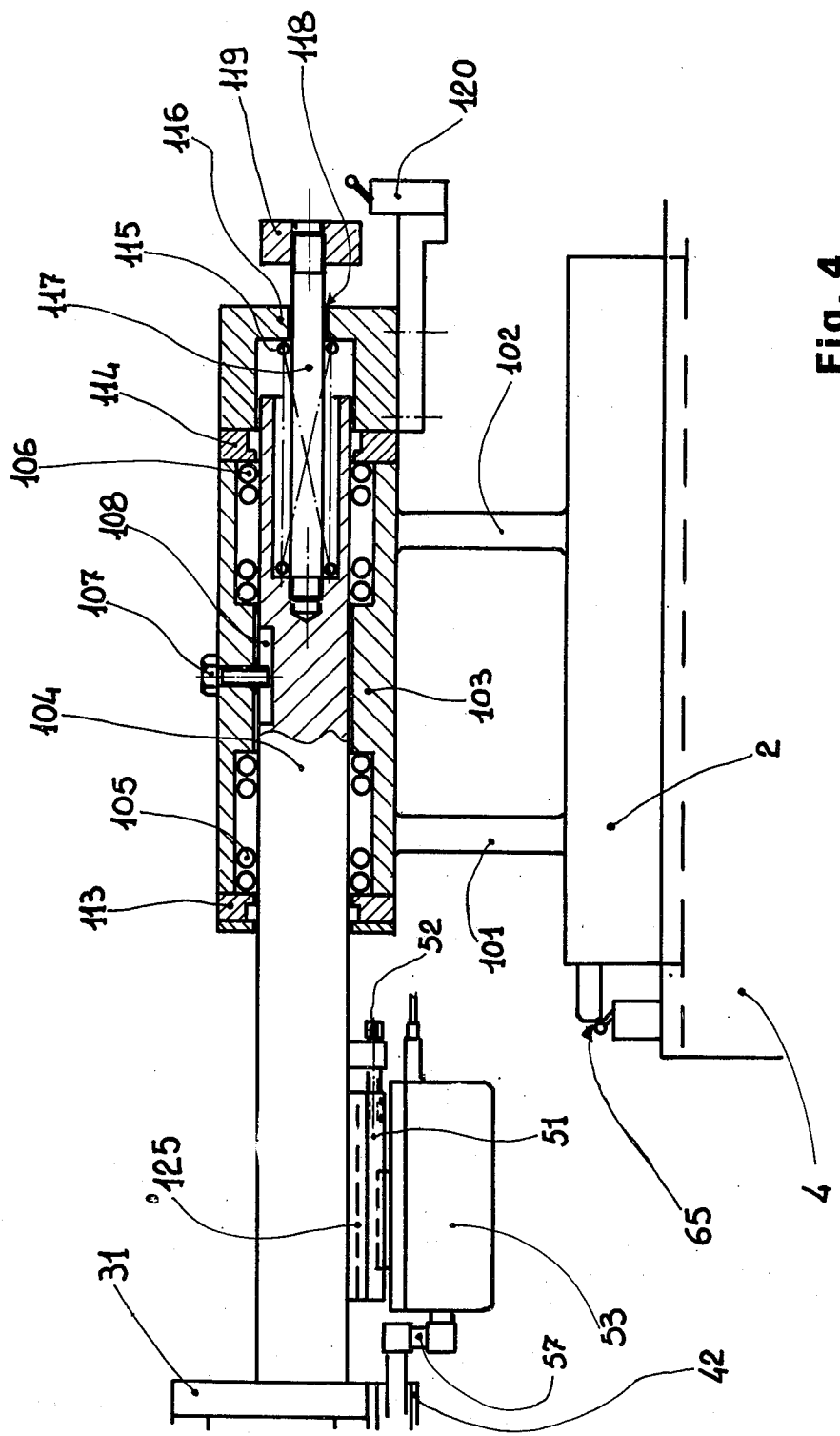
FIG. 4 is a partially sectioned side-view of a station of the same kind illustrated in FIGS. 1-3, but with some modifications.

In FIG. 4 there is shown a different system for connecting the support of movable positioning means and measuring means to slide 2 through an oscillating device, particularly a recoil device.

Slide 2 carries stanchions 101 and 102 which support on their turn a hollow element 103.

Inside element 103 a shaft 104 is slidable on two ball bushings 105 and 106.

A screw 107 cooperates with a groove 108 in order to limit the run of shaft 104 with regard to element 103 in both the two directions.

Two gaskets 113 and 114 seal and protect ball bushings 105 and 106 from dirt outside.

A helical spring 115, compressed between element 104 and an element 116 integral with element 103, pushes out element 104 and supplies the requested pressure during the positioning and measuring operations of pistons 7.

A pin 117, screwed to shaft 104, passes through spring 115 and comes out of cover 116 through a hole 118.

A dog 119 is screwed to the external end of pin 117, and cooperates with a microswitch 120 in order to provide a safety stop (it has the same functions of microswitch 66 of FIG. 1).

Plate 31 is fixed to the front part of shaft 104 while a plate 125, supporting slide 51, is fixed to the lower part of the same shaft.

Plate 31 carries the same positioning means shown in FIG. 1 and heads 53 and 54 are fixed to slide 51, as already shown in FIG. 1.

The working of this device is similar to that one previously described with reference to FIG. 1, the difference resides naturally in the shaft sliding on bushings instead of the support hanging through leaf springs.

In order to reduce the stresses suffered by the various elements and to improve the accuracy of the displacements, it is better to use two groups placed side by side, of the same kind of that shown in FIG. 4, each of them being constituted by shafts like shaft 104, with relative ball bushings and springs. Then the two shafts are frontally connected to a single plate 31 and to slide 51, while at the opposite ends they are connected to a cross bar carrying dog 119, for the microswitch 120 operation.

Obviously the claimed invention may be used also in measuring stations different from those shown in detail in the Figures attached, particularly in stations adapted to measure symmetrical workpieces.

What is claimed is:

1. In an automatic measuring device for measuring linear dimensions of workpieces and comprising:
   a support for supporting a workpiece in a measurement position when the measurement of said linear dimensions is carried out;
   loading and unloading means for loading the workpiece onto and unloading it away from said support;
   reference elements arranged at said support for providing a mechanical reference to the workpiece to be measured;
   positioning and reference means movable towards and away from said support for contacting the workpiece and positioning it on the support, the positioning and reference means including: a slide movable toward and away from said support; positioning and reference members carried by the slide for contacting the workpiece and positioning it on the support; and a mechanical link coupled between the slide and the positioning and reference members for permitting a relative movement of the positioning and reference members in respect to the slide; and
   measuring heads having moving arms carrying feelers adapted to contact the surface of the workpiece for measuring said dimensions, the improvement in which said measuring heads are fixedly but adjustably coupled to said positioning and reference members, the positioning and reference members comprising a protection member embracing said moving arms for protecting them from casual impacts, said protection member being arranged to cooperate with the workpiece to drive it towards the measurement position.

2. In an automatic measuring machine for measuring the dimensions of pistons and comprising:
   a rest for supporting a piston in a measurement position; a conveyor moving in a linear direction for advancing in succession the pistons towards and away from the rest;
   reference elements arranged at said rest for providing a mechanical reference to the piston to be measured;
   a movable device for locating the piston to be measured in the measurement position, the movable device including: a slide slidable towards and away from said rest, in a direction perpendicular to said linear direction; a support with reference members carried by the slide, said reference members being adapted to thrust the piston towards said reference elements and to provide a further mechanical reference to locate the piston in said measurement position;

and a yielding link coupling the reference members to the slide; and measuring means including measuring head means with two moving arms carrying relevant feelers adapted to contact the piston for measuring a diameter thereof, the improvement in which said yielding link includes substantially parallel leaf springs coupled between the support and the slide; the measuring head means is fixedly but adjustably fixed to said support through a slide adjustable in said direction perpendicular to said linear direction; said reference members are coupled to the support through zero-setting spacers, and wherein the machine further comprises a protective member embracing said moving arms for protecting them from impacts, while permitting the feelers to contact the piston, said protective member being adapted to cooperate with the piston to drive it towards the measurement position.

* * * * *

UNITED STATES PATENT AND TRADEMARK OFFICE
CERTIFICATE OF CORRECTION

PATENT NO. : 3,974,569
DATED : August 17, 1976
INVENTOR(S) : Gastone ALBERTAZZI

It is certified that error appears in the above-identified patent and that said Letters Patent are hereby corrected as shown below:

[73] Assignee, line 2, should read

-- Accomandita Semplice di Mario --

Signed and Sealed this

Thirty-first Day of October 1978

[SEAL]

Attest:

RUTH C. MASON
Attesting Officer

DONALD W. BANNER
Commissioner of Patents and Trademarks